A. F. NYE.
MACHINE FOR FORMING BUTTER PATTIES.
APPLICATION FILED FEB. 1, 1918.

1,322,042.

Patented Nov. 18, 1919.
4 SHEETS—SHEET 1.

WITNESSES:
Walter B. Payne

INVENTOR
Alvin F. Nye
BY
his ATTORNEYS

A. F. NYE.
MACHINE FOR FORMING BUTTER PATTIES.
APPLICATION FILED FEB. 1, 1918.
1,322,042.
Patented Nov. 18, 1919.
4 SHEETS—SHEET 2.
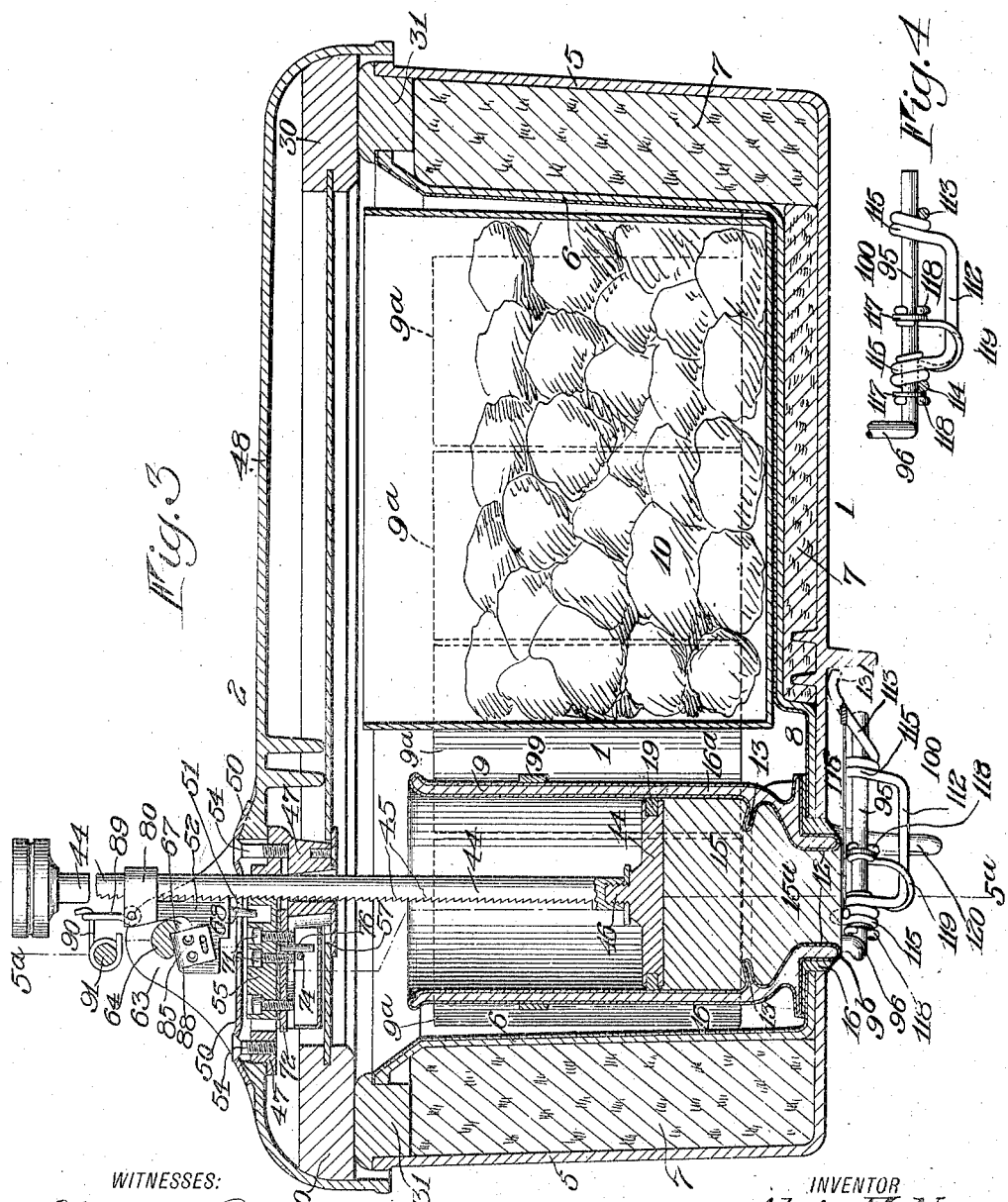
WITNESSES:
INVENTOR
Alvin F. Nye
BY
his ATTORNEYS

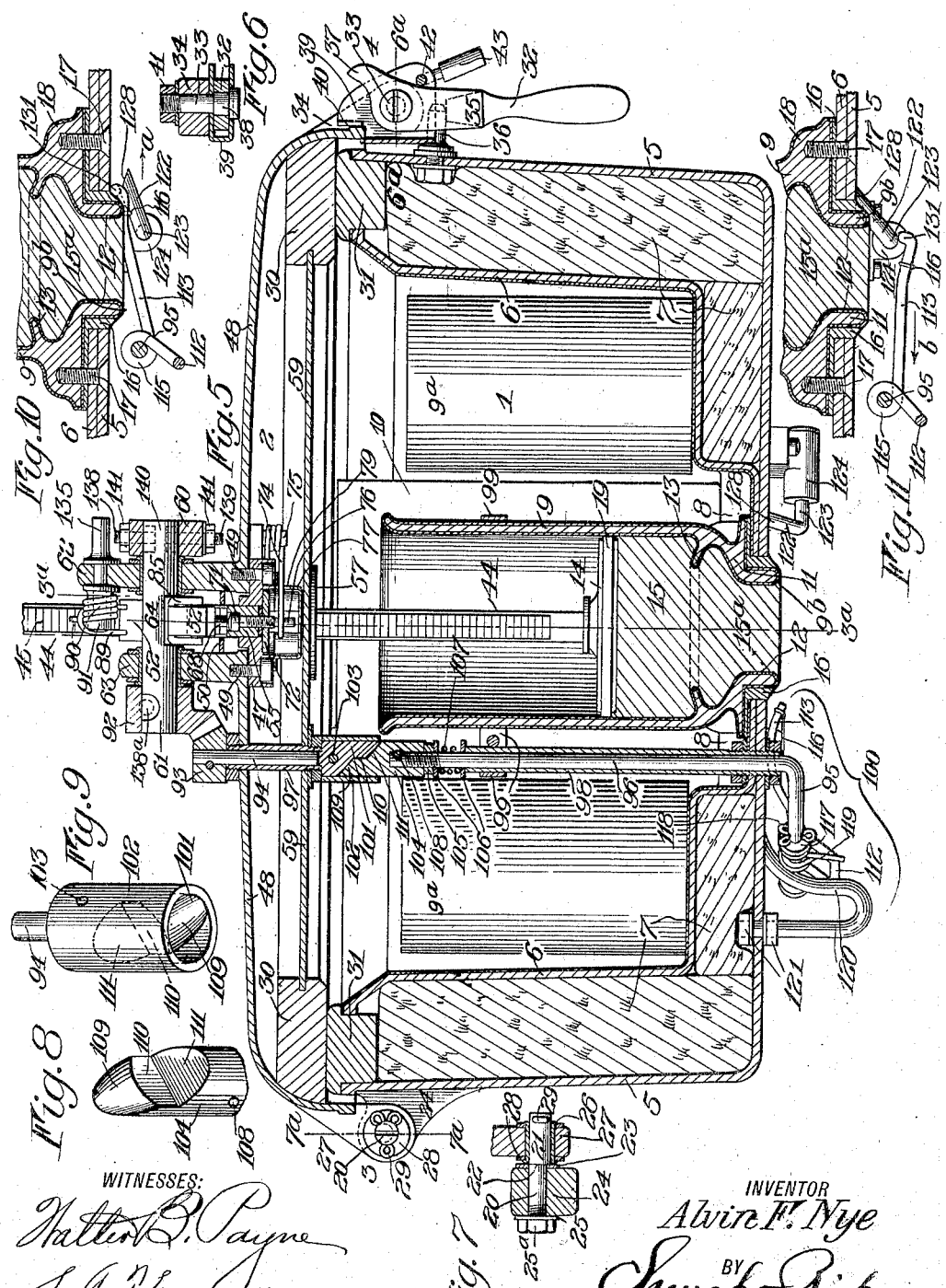

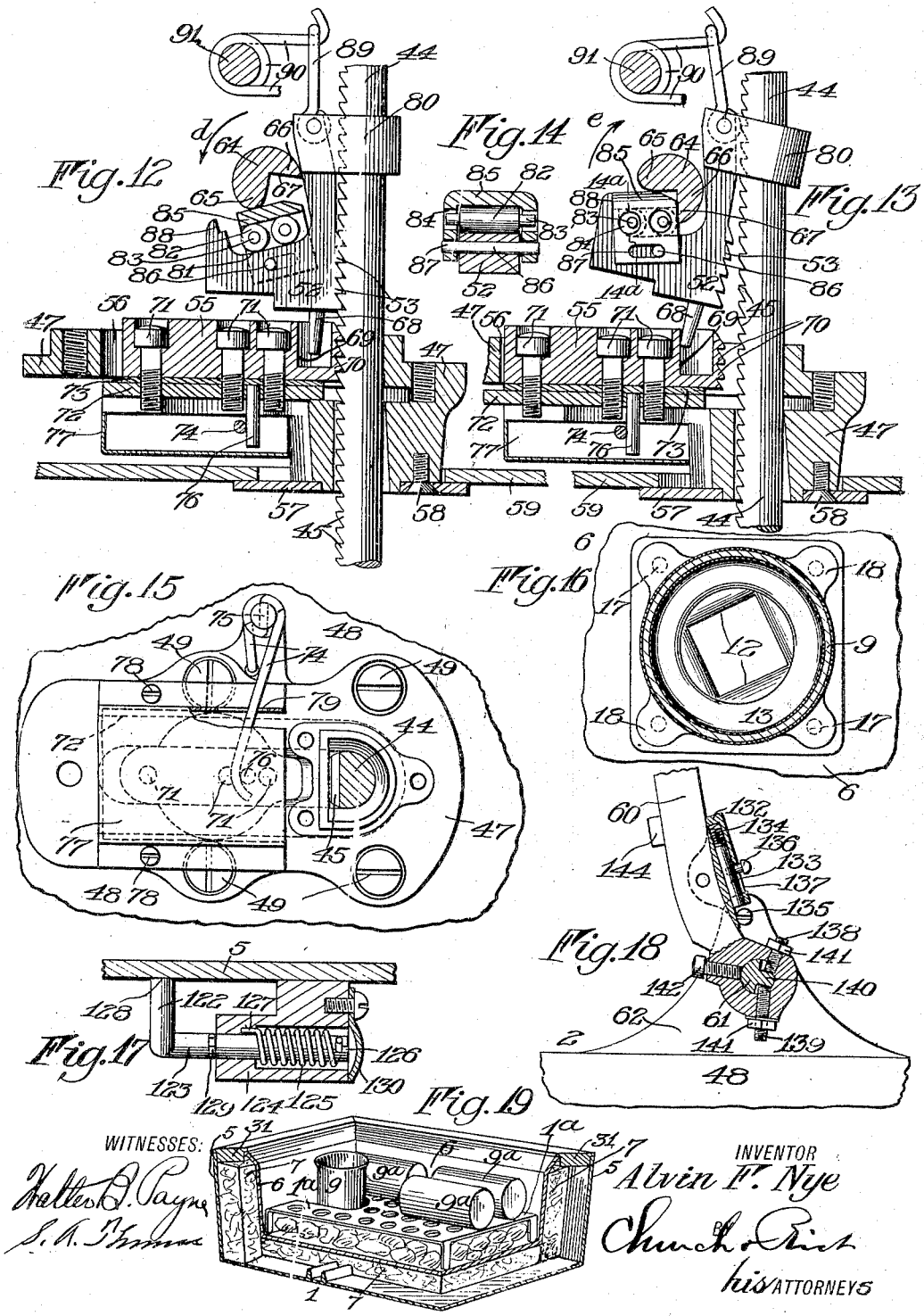
A. F. NYE.
MACHINE FOR FORMING BUTTER PATTIES.
APPLICATION FILED FEB. 1, 1918.
1,322,042.
Patented Nov. 18, 1919.
4 SHEETS—SHEET 4.
INVENTOR
Alvin F. Nye
WITNESSES:
his ATTORNEYS

UNITED STATES PATENT OFFICE.

ALVIN F. NYE, OF ROCHESTER, NEW YORK, ASSIGNOR, BY MESNE ASSIGNMENTS, TO FOOD APPLIANCES MANUFACTURING CORPORATION, OF ROCHESTER, NEW YORK, A CORPORATION OF NEW YORK.

MACHINE FOR FORMING BUTTER PATTIES.

1,322,042. Specification of Letters Patent. Patented Nov. 18, 1919.

Application filed February 1, 1918. Serial No. 214,885.

*To all whom it may concern:*

Be it known that I, ALVIN F. NYE, of Rochester, in the county of Monroe and State of New York, have invented certain new and useful Improvements in Machines for Forming Butter Patties; and I do hereby declare the following to be a full, clear, and exact description of the same, reference being had to the accompanying drawings, forming part of this specification, and to the reference characters marked thereon.

This invention relates to machines of the class used for forming butter patties of any desired uniform size to be served to the patrons of restaurants, hotels or boarding houses, or in other situations, where rapid serving of a large number of butter patties is desirable or necessary. The invention has for one object to facilitate formation and delivery of the butter patties with less expenditure of power, and more quickly and with greater certainty and accuracy than is possible when using other machines of this general character. A further object is to provide a butter patty forming machine having a container which will not allow contamination of its butter contents by formation therein of verdigris or other deleterious substances or compounds, thereby preserving the butter mass in wholesome condition until it is all formed into patties ready to serve. Further objects are to provide a simple, strong and durable machine which when operated, even by unskilled persons, is not liable to get out of order, and which may be easily and thoroughly cleaned and is in all respects sanitary, and certain parts of which may be adjusted to prevent its unauthorized opening to obviate stealing of its reserve butter contents. To these and other ends the invention consists in certain improvements and combinations of parts, all as will be hereinafter more fully described, the novel features being pointed out in the claims at the end of the specification.

In the drawings:

Fig. 3 is a transverse vertical section taken on the line 3ª—3ª of Fig. 5;

Fig. 4 is a detail sectional view of the butter patty severing device in the plane of its supporting arm;

Fig. 5 is a transverse vertical section taken on the line 5ª—5ª in Fig. 3;

Fig. 6 is a detail sectional plan view taken on the line 6ª—6ª in Fig. 5;

Fig. 7 is a detail vertical section taken on the line 7ª—7ª in Fig. 5;

Fig. 8 is a top perspective view of the head of the lower shaft member which directly operates the butter patty severing device;

Fig. 9 is a bottom perspective view of a socket which is carried by the casing cover and coacts with the shaft head of Fig 8;

Figs. 10 and 11 are detail vertical transverse sections through lower portions of the butter container and the casing, and respectively illustrate reverse movements of the rocking oscillatory patty severing device;

Figs. 12 and 13 are enlarged detail vertical sectional views respectively showing the lever operated pawl and the coacting detent engaged with and disengaged from the rack rod of the butter expelling plunger;

Fig. 14 is a detail vertical section taken on the line 14ª—14ª in Fig. 13;

Fig. 15 is a bottom plan view of the plunger rack rod and detent guide block, with the rod in cross section;

Fig. 16 is a detail top plan view of the butter container which is in horizontal section on the line 16ª—16ª in Fig. 3;

Fig. 17 is an enlarged detail longitudinal section taken on the line 17ª—17ª in Fig. 2;

Fig. 18 is a broken out sectional side view of the inner end of the plunger operating lever and its bearings, and Fig. 19 is a small scale broken out sectional perspective view of the casing body showing a different disposal therein of the ice and the reserve butter supply.

Similar reference characters throughout the several views indicate the same parts.

Figure 1:
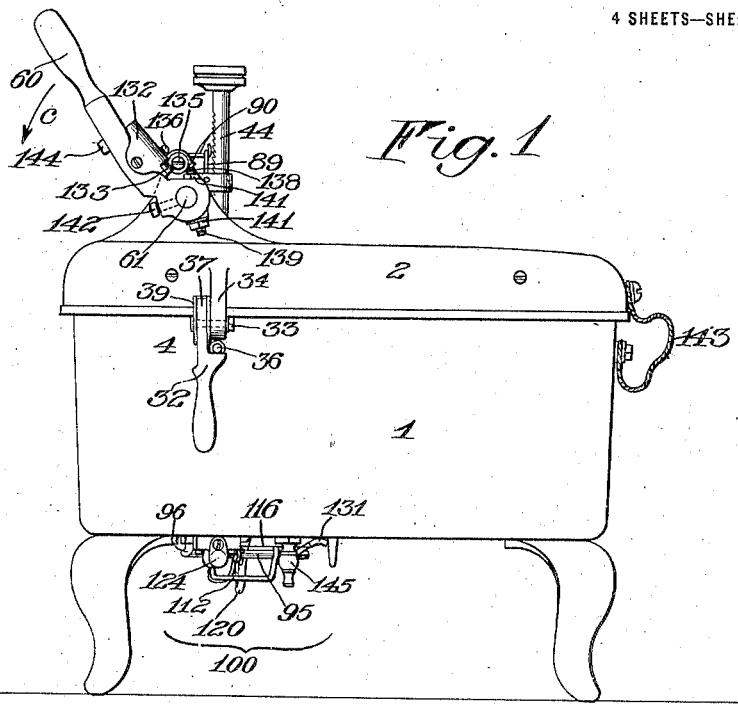
Figure 1 is a side elevation of a machine comprising a preferred embodiment of this invention.

The machine casing comprises a main double-walled body portion 1, shown supported on legs, and a double-walled cover 2, which is hinged to the body at 3, and latched thereto at 4, in a manner hereinafter more fully described. Figs. 3 and 5 of the drawings more especially show that the casing body 1 has an outer wall 5 and an inner wall 6, with an interposed filling 7 of cork or other nonconductor of heat. A portion of the bottom of the inner casing wall 6 is depressed preferably to the outer wall 5, thereby providing within the casing a comparatively small shallow bottom chamber 8 which at times may maintain around the lower neck portions of a butter container 9 set therein, a suitable quantity or volume of the ice or other cooling medium charged within the casing to keep the container neck and mouth at a suitable temperature to assure easy discharge of butter therefrom to form severed butter patties of proper consistency for immediate use. Figs. 3 and 5 show an ice holding box 10, and reserve butter cylinders $9^a$, adapted to enter the container 9, and set on end upon the casing floor at opposite sides of the ice box and of the container, as is usually done; but a number of reserve butter cylinders $9^a$ may be laid flatwise upon a tray $1^a$, supported in the casing body 1, and a supply of ice is filled into the casing below the tray and around the lower portion of the container 9, as sufficiently shown in Fig. 19 of the drawings.

The illustrated container 9 has a general cylindrical form ending below in a contracted neck portion 11 which is shown with a square outlet or mouth 12 for producing marginally square butter patties, but the mouth may be round or of other form to produce correspondingly shaped patties. Above its neck 11, the container side wall flares upwardly and outwardly to its junction with the main body portion of the wall, and about at this level the container has an inwardly extending guard flange 13, which prevents the suction of a butter expelling plunger 14, while being withdrawn from the container, from pulling upward with it that portion $15^a$ of the butter charge 15 which lies below the level of the flange 13. This butter charge portion $15^a$ thus remains solidly within and closes or plugs the container neck 11, and mouth 12 when the plunger 14 is withdrawn to allow another print or form of butter taken from the box 10, to be placed in the container wherein it first rests upon the guard flange 13. The butter plug $15^a$ prevents dust entering the container at its mouth 12 during recharging of the container, and it also assures that all butter patties cut from the outwardly pressed butter mass after the container is recharged, shall have the same form, size and weight as those formerly made, since the new butter charge when under pressure of the plunger 14, at once intimately joins with the upper portion of the retained butter plug $15^a$, thus giving little chance for the formation of air bubbles in the butter mass above the container neck during or after recharging and assuring the feeding of a solid mass of butter from the container mouth to provide for producing severed butter patties of uniform shape and consistency. It will be seen that the action of the guard flange 13, in holding back the butter portion $15^a$ assures that the last true level of the outer face of the butter in the container neck 11, is not disturbed by the upward suction induced by the rising plunger, and therefore the first downward feeding of the butter mass after recharging the container results when the expelled butter is severed at the container mouth, in the formation of a butter patty having the same uniform thickness and consistency as the butter patty last severed before charging the container. The lever actuated mechanism by which the plunger 14 is operated will be hereinafter described.

Extensive practical experience has demonstrated that a butter container having a vitreous or porcelain inner surface with which the butter mass is in contact is very much superior to a cast or sheet metal container not having a vitreously enameled inner surface no matter how smoothly its inside metal surface may be finished either with or without plating it. As the essential thing is to provide a container having a vitreous or porcelain inner surface with which the butter mass is in contact it is immaterial whether the container be formed wholly of vitreous material such as porcelain or glass or whether it be formed with a metal core or shell having a vitreous inside lining or enamel. One advantage of a vitreous or vitreously enameled container is due to the experimentally disclosed fact that butter will not stick to its vitreous surface as it does to the inner wall of a metal container, and that very much less power is required to intermittently expel the butter by a plunger from a vitreous container than is required to expel the butter by a plunger from a container not formed with a surface of this nature. A second important advantage is that a container having a vitreous or vitreously enameled inner surface in contact with the butter mass does not permit decay of the butter by deposits of verdigris or other deleterious substance or compound which will not form in the butter mass as it does when butter is held in a metal container. A porcelain or glass container being fragile is liable to break under pressure incident to expelling the butter from it by a plunger. It therefore is an obvious improvement to provide a container made with a metal core or inner body strong enough to resist fractures by any plunger pressure, and enameled inside to provide a smooth vitreous surface. In practice the cast iron core or inner shell of the container is not internally or externally machined or finished before enameling it all over, thus materially lessening its first cost. To provide a secure fastening for this enameled container to the possibly warped enameled bottom walls 5, 6 of the casing body 2, a layer 16 of plaster Paris or other cement is applied around the container neck 11, and upon a horizontal shoulder and flange thereon. A plug templet (not shown) is placed within the container 9, and coacts with an opening in or a part of the casing cover 2, to locate the container mouth within the casing bottom opening and properly position the container relatively to the later adjusted plunger 14 and to its operating mechanism held to the cover; and when the container is pressed downward its neck portion firmly beds upon and adheres to the cement which also adheres to the casing body walls 5, 6, thereby giving the truly positioned container a firm fluid-tight fastening to the vitreously enameled casing which is made more secure by passing screws 17 upward through the walls 5, 6, into lugs 18 formed on the base of the container, as shown in Figs. 2, 10, 11 and 16, of the drawings.

In view of the enameling of the somewhat rough surfaced cast iron shell of the container to reduce its cost as above stated, its enameled inner surface is liable to be lumpy, or to be slightly warped by the high heat required for the enameling process, and therefore the nature of the plunger packing becomes important. Experiments have demonstrated that a packing of cork meets the requirements which are that the packing shall have sufficient elasticity to remain tight and yet work easily notwithstanding the aforesaid irregularities of form of the enameled container, and that the packing shall not cause contamination of the butter mass therein. Such a packing is provided in a preferred manner for the plunger 14, by grooving its periphery and fitting strips 19 of cork in the groove, as shown in Figs. 3 and 5 of the drawings.

In view of the possible warping of the walls of the casing body 1 and cover 2, when enameling them, each of their two hinges 3, one of which is shown in Figs. 5 and 7, has a pivot pin 20, provided with an enlarged eccentric portion 21, forming a shoulder 22, against which rests a clamping washer 23 placed on the pin against one side of a lug 24, formed on the outer wall 5 of the casing body 1, and through which lug the pin 20 passes. Outside of this lug is placed on the pin a washer 25 abutted by a clamping nut 25ª, which fixedly binds the pin 20 in the casing body lug 24. The eccentric portion 21 of the hinge pin 20 may turn in a protective metal sleeve 26 which is passed through a bore in a lug 27 formed on the casing cover 2. This sleeve is preferably expanded at its ends upon reinforcing washers 28 placed on the sleeve one at each side of the enameled cover lug 27, and a cotter pin 29 is passed through the pin portion 21, outside of the outer washer 28. If when the cover 2 is closed its marginal wood frame 30 undesirably stands off from the opposed marginal frame 31 of the casing body 1, the hinge pin nut 25ª is loosened thus allowing the pin 20 to be turned to adjust its eccentric portion 21, to cause the cover frame 30 to tightly close against the casing frame 31 to exclude atmospheric air or germs from the interior of the casing. Should the cover frame 30 at first bind too tightly upon the body frame 31, the eccentric portion 21 of the pivot pin 20 would be turned to relieve the cramping of the two frames and assure their proper tight closure.

The cover latch 4, comprises a lever 32, which is fulcrumed on a bolt 33 having its bearing in a lug 34 formed on the casing cover 2. This lever has a lug 35 adapted to latch underneath a stud 36 to hold the cover tightly closed. This stud is bolted to and projects horizontally from the outer front wall 5 of the casing body 1, as shown in Fig. 5. The lever 32 has a head lug 37, adapted to strike a part of or on the cover 2 to limit upswinging of the lever after it is unlatched from the stud 36, and thus permit use of the lever as a handle for conveniently opening the cover. To provide a simple and efficient locking device which will prevent opening of the casing cover to obviate stealing of the reserve supply of butter in the box 10, it is preferred to mount the lever 32 loosely upon an enlargement 38 of the bolt 33, and between opposite side plates of a sheet metal yoke 39, which is placed upon the bolt and has at its bend an upper offset portion 40, which rests against the rim of the cover 2 and forms the stop for the lever lug 37, when opening the cover by the lever. A nut 41, on the bolt 33, holds the bolt securely to the cover lug 34, and at the same time the enlarged portion 38 of the bolt presses by its inner shoulder upon the inner side plate of the yoke 39 to hold the yoke to the bolt while allowing the latch lever 32 to turn thereon during latching and unlatching of the cover. The side plates of the yoke 39 project outward beyond the fully latched lever 32, and thus give room for transversely boring them at 42, so that the hasp of a lock 43 may be passed through said bores 42, outside of the latched lever and below the level of its fulcrum bolt 33, to prevent opening of the casing cover 2 by any unauthorized person not having the key of the lock.

The plunger operating rod 44 has along one side a series of rack teeth 45. As varying quantities of butter are to be intermittently expelled from the container 9 when forming butter patties of varying thickness, the rod 44 has a readily detachable connection with the plunger, such as by screwing it upon a threaded stud 46 thereon, as shown in Fig. 3, thereby allowing a rack rod having longer or shorter teeth to be substituted for the rod last used, for altering the length of the intermittent forward strokes of the plunger by its operating lever and pawl, as the desired thickness and weight of the butter patties may require. The rod 44 is loosely fitted in a vertical opening formed through a guide block 47 which is shown fastened to the outer enameled metal plate 48 of the machine cover 2, by four screws 49, all shown in Fig. 15, and two shown in Fig. 5. An escutcheon plate 50 has a slot 51, permitting movement of a pawl 52 which preferably has five teeth 53 adapted to engage the teeth 45 of the plunger rod 44.
This plate 50 is held to the fixed guide block 47 by two end screws 54 entering threaded holes in the block and makes a covering finish over the casing opening which is entered by portions of the block 47, and by parts of the rack rod detent 55, which slides forward and backward in an opening 56 of the block. An inner escutcheon plate 57 fitted to the lower end of a boss on the block 47, and held to the block by screws 58, makes a finish over the opening in the inner plate 59 of the cover 2, through which the boss projects. The plate 57 gives a lower steadying support to that end of the block 47 in which the plunger rod 44 works.
The pawl 52 and the rack rod 44 and plunger 14, are actuated for expelling butter from the container 9, by an oscillatory lever 60, which is adjustably fixed to a horizontal shaft 61 journaled preferably in metal bushings inserted in two enameled lugs 62, 63, formed on or fixed to the cover plate 48, and between which lugs the escutcheon plate 50 is located, as shown in Fig. 5. The opposite ends of the metal bushings are expanded upon washers at opposite faces of the lugs 62, 63, like the bushings and washers 26, 28, used at the cover hinge 3, and shown in Figs. 5 and 7. In the illustrated embodiment of the invention the cylindrical shaft 61 is partly cut away transversely at its central portion to provide a cam 64 which is formed with a rather sharply rounded heel portion 65 which depresses the pawl 52 when it is engaged with the rack rod 44, to lower the plunger 14 for expelling the butter when the lever 60 is lowered. The cam 64 also has a toe portion 66 shaped to provide a tangential shoulder 67, which disengages both the toothed pawl 52 and the toothed detent 55 from the plunger rod rack 45, when the lever 60 is raised, the disengagement of the detent being effected by a stud 68, projecting downwardly from the pawl 52, and acting upon a shoulder 69, which is the back wall of a recess formed in the detent 55 behind its three end teeth 70 which coact with the teeth 45 of the plunger rod 44. The detent 55 is made readily detachable to permit a detent having longer or shorter teeth to be substituted for the one last used, since the detent must have teeth of the same pitch or length as the teeth of the plunger rod 44, and the teeth of the pawl 52, it is desired to use. To conveniently effect this substitution the detent 55 is detachably held by screws 71, to a lower and wider guide plate 72, which slides in rabbeted bearings provided on the block 47. In order to make the detent teeth 70 properly register with the plunger rod teeth 45, one or more shims 73 may be placed between the detent and its supporting guide plate 72. The detent 55 and its guide plate 72 are forced forward to normally hold the detent teeth 70, engaged with the plunger rod teeth 45, by a spring 74 held to a pin 75 fixed in a lug on the block 47, and acting upon a pendent pin 76, fixed to the plate 72. Detent 55 is preferably so adjusted by means of these shims that the points of its teeth 70 engage the inclined sides of the rod teeth 45 adjacent their points when the rod is in its most advanced position, so as to allow a slight retrograde movement of the rod from such advanced position while the teeth of each member are becoming seated in the intervals between the teeth in the other. This retrograde movement of the plunger relieves the pressure of the latter on the mass of butter, thus arresting the tendency of the latter to exude from the container outlet. It is preferred to cover the inner ends of the three screws 71, and a portion of the spring 74, by a sheet metal casing 77, which is held at its side flanges by screws 78 to the fixed block 47, and has a side slot 79, admitting the longer limb of the spring 74 to act upon the detent pin 76.

Figs. 3, 12 and 13 show that the plunger operating pawl 52, as viewed from the side, has a general right angular form and at the top of its upright stem fixedly carries a rearwardly projecting yoke 80, which loosely incloses and guides the plunger rod 44, and the rod reciprocally guides the vertically moving pawl. The forwardly projecting base portion of the pawl 52, has a rearwardly and upwardly inclined face 81 forming a track upon which run the larger body portions of two rollers 82, the reduced end studs 83 of which rest and have play within openings 84 larger than the studs 83 and smaller than the main bodies of the rollers, and formed in the opposite side walls of an arched saddle 85, the head of which is interposed between the rollers 82 and the pawl operating cam 64. A pin 86 in the pawl 52 enters slots 87 made in the opposite side walls of the saddle 85 and ranging about parallel with the pawl track 81 and the saddle head. This pin-and-slot connection at 86—87, together with the free play of the roller studs 83 in the saddle openings 84, permits a free but limited movement of the saddle upon the rollers 82, in the direction of the pawl track 81, and with minimum friction, as the cam 64 is operated by the lever 60. A shoulder 88 on the pawl 52, is at times struck by the forward end of the saddle head, when the lever 60 is moved to the extreme of its upward stroke, for disengaging both the pawl 52 and the detent 55 from the plunger rod teeth 45, as hereinafter more fully explained. A wire bail 89 hung by its end eyes on a pin in the pawl 52 is engaged under its head by one end of a spring 90, the coil of which is supported on a stud 91 fixed in the cam-shaft bearing lug 62, and the other end of the tensioned spring is hooked over said lug, whereby the spring normally lifts the bail and the yieldingly sustained pawl and, as permitted by the cam 64, holds the pawl teeth 53 engaged with the plunger rod teeth 45. When another pawl 52 having longer or shorter teeth is to be substituted for the one last used to have its teeth match those of a substituted plunger rod 44 and detent 55, it is only necessary to disengage the pawl from the rod 44 and remove the rod and then disengage the pawl suspending bail 89 from the sustaining spring 90, which allows the pawl 52 and its roller supported saddle 85 to then be together lifted out from under the operating cam shaft 61 to permit substitution of another pawl for coaction with the substituted plunger rod and detent.

At one end the cam shaft 61 adjustably carries a segment gear 92 which engages a segment gear 93 fixed to the upper member 94, of a vertical two-part shaft actuating the butter patty severing device which is connected underneath the casing body 1, to a horizontal arm portion 95 of the lower shaft member 96. The upper shaft member 94 is preferably journaled in a sleeve 97 shown held by nuts to the outer and inner plates 48, 59, of the cover 2. The lower shaft member 96 is journaled in a longer sleeve 98 secured by threads and nuts to the bottoms of the casing body plates 5, 6, and braced at its upper part by a strap 99, coupled around the sleeve and the fixed butter container 9, as shown in Figs. 3 and 5. The shaft sleeve bearing 98 prevents leakage around the shaft member 96, of the melted ice or fluid used within the casing as a butter cooling medium.

Figure 2:
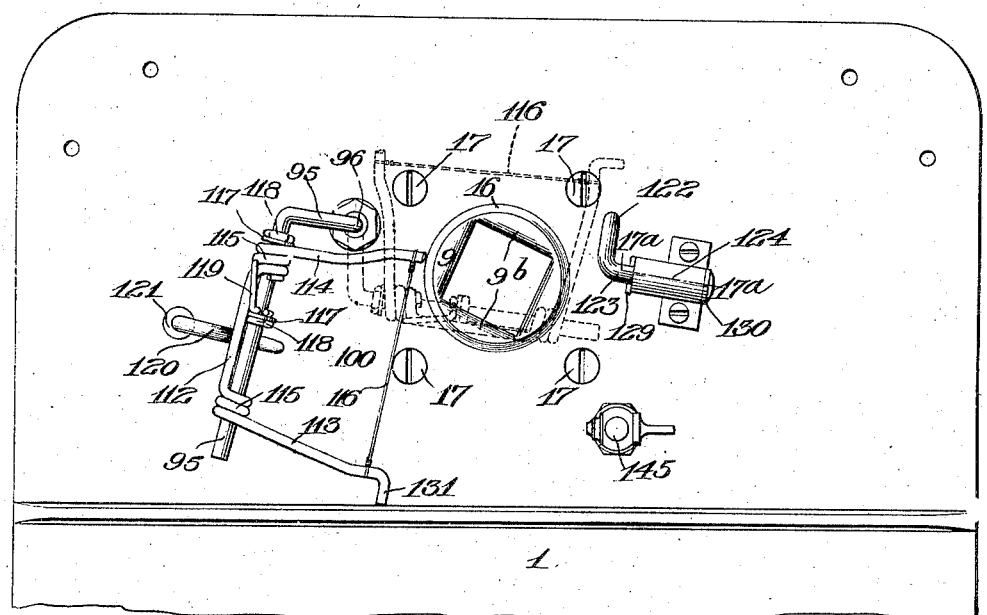
Fig. 2 is an enlarged bottom plan view of the machine with its casing partly broken away.

To detachably connect the shaft member 94 on the cover 2, with the shaft member 96 in the casing body 1, a special coupling is provided which will permit opening and closing of the cover upon its hinges 3, or permit lifting off and replacing of an unhinged cover, and will always positively assure a correct initial retracted adjustment of the butter patty severing device generally marked 100, relatively to the gearing 92, 93, and to the plunger operating lever 60, as hereinafter more fully explained. One preferred embodiment of this shaft coupling shown in Figs. 5, 8 and 9, comprises a foot-block 101 fixed to the upper shaft member 94, and surrounded by a cylindrical guard 102 which is pinned to it at 103, and a head-block 104 which is screwed upon the upper threaded end of the lower shaft member 96, upon which had already been adjusted a nut 105, two spaced washers 106, 106, and a normally expanding spiral spring 107, placed between the two washers. The lower washer rests upon the top of the fixed sleeve 98. A pin 108 keys the head-block 104 to the shaft member 96. The two coupling blocks 101, 104, have respective inclined or scarfed end faces 109, respective central vertical shoulders or faces 110, and respective inclined or scarfed inner faces 111. The foot-block guard 102 is long enough to inclose all three joint faces 109, 110 and 111 of the two coupling blocks and thus forms a guide which receives the scarfed and shouldered portions of the head-block 104 as the cover 2 is closed upon the casing body 1. The scarfed end portion 109 of the foot-block 104, and of the head block 101, is somewhat rounded over transversely as shown in Figs. 8 and 9, to assure easy and full engagement of all three joint faces 109, 110 and 111 of the two coupling blocks 101 and 104, while the casing cover 2 is being closed, at which time the lower shaft member 96, with its arm 95 and the attached butter patty severing device 100, may yield downwardly against the tension of the spring 107 which thus forms a buffer which relieves possible shocks incident to full and quick engagement of the two coupling blocks. Fig. 2 shows by full and dotted lines that the horizontal oscillation of the butter patty severing device 100, encompasses an arc of a little over ninety degrees around the axis of the shaft members 94, 96. When these shaft members are coupled by the fully engaged blocks 101, 104, as shown in Fig. 3, the butter patty severing device 100 has the normal retracted full line position shown in Figs. 2 and 5. Should the severing device 100, with the shaft member 96, be rotarily displaced accidentally after opening of the casing cover 2, the said parts 96, 100, will be automatically restored to the full line normal positions by mutual contact and engagement of the meeting rounded scarfed faces 109 of the respective coupling blocks 101, 104, and these blocks will then fully engage each other as shown in Fig. 3, as the casing cover 2 fully closes upon the casing body 1, prior to the next operation of the lever 60 for expelling sufficient butter from the container 9 to form the next severed butter patty.

The butter patty severing device 100, as shown in Figs. 1 to 5, and 10 and 11 of the drawings, has a three sided wire frame formed with a cross bar 112 and opposite end arms 113, 114, the wire being preferably coiled at 115, at the junction of the parts 112, 113, 114. These coils 115 have a frictional bearing upon the arm 95 of the shaft member 96, which retards or stops the vertical rocking movement of the severing device 100 upon the arm. A butter patty cutting wire or filament 116 is attached under tension to the outer ends of the arms 113, 114, and works across and closely against the discharge end or mouth of the butter container 9. To increase the frictional hold of the severing device upon the shaft arm 95, two washers 117 are placed upon the arm inside of two cotter pins 118 which pass through the arm and are bent transversely to present the largest possible surface for frictional contact laterally with the washers 117. An expanding bowed wire spring 119 has two end eyes embracing the arm 95, one eye acting directly upon one of the washers 117 to frictionally force it to the adjoining fixed cotter pin 118, and the other eye engaging and acting upon one of the wire frame coils 115, and forcing it outward against the other washer 117 to frictionally force it against the other fixed cotter pin 118, the object being to frictionally hold the severing device 100 in either of its two vertically adjusted positions in one of which the wire 116 is moved closely to and across the mouth of the butter container 9 to sever a butter patty, and in the other of which positions the wire 116, while being retracted to normal position, stands off from the container mouth so as to be entirely clear of the butter then being expressed therefrom to form the next patty.

The vertical rocking of the severing device 100, at its coil bearings 115 upon the shaft arm 95, is effected automatically by two stops arranged at opposite extremes of its horizontal oscillation. One stop 120, comprises a bent wire or rod shown fixed at one end by nuts 121 to the bottom plate 5 of the casing body and outwardly and upwardly curved at its portion facing the cross bar 112 of the severing device so that as the latter is about finishing its retractive movement from the dotted line position in Fig. 2, to the full line position, the cross bar 112 will strike the stop 120, and be depressed thereby to rock the severing device on the shaft arm 95 and again carry its cutter 116 up to the level or plane of the butter container mouth in readiness for severing the next butter patty. The other severing device stop is the upwardly inclined yielding switch arm 122 of a rod 123 which enters a counterbored housing 124 fixed to the casing bottom plate 5. A coiled spring 125 surrounds the rod 123 and at one end enters a transverse slot 126 made in the end of the rod, and at its other end is tightly held in a bore 127 of the housing. This spring normally holds the beveled extremity 128 of the yielding rod arm 122, closed to the casing plate 5, as shown in Figs. 5, 11 and 17. A cotter pin 129 is preferably passed through the rod 123 next one end of the housing 124, and a cap 130 is applied at its other end to protect the spring 125, as best shown in Fig. 17. As the severing device 100 is approaching the end of its effective cutting stroke in direction of the arrow $a$ in Fig. 10, a laterally projecting end portion 131 of its arm 113 strikes and rides upon the upper inclined face of the stop arm 122, thereby lowering or opening it and then passing over its beveled end 128, and somewhat beyond the arm 122, to the extreme of its effective stroke shown by dotted lines in Fig. 2, and after the severing device 100 begins its return stroke in direction of arrow $b$ in Fig. 11, toward the full line position, its portion 131 rides outward over the back of the now retracted or closed stop arm 122, thereby swinging the cutter 116 downwardly and clear of the butter being expressed from the container 9 to form the next patty. As the severing device reaches the limit of its return stroke its bar 112 strikes the stop 120 which again rocks the device upon the shaft arm 95, to raise the cutter 116 to the level of the mouth of the container 9, ready to cut off another butter patty on the next effective stroke of the severing device. The arrangement of the washers 117, the cotter pins 118, and the end eyes of the expansive spring 119, relatively to the shaft arm 95, and the coil bearings 115 of the severing device 100, not only assures the necessary retarding friction to hold the patty cutter 116 either upwardly or downwardly in the positions into which it is adjusted by the respective stops 120, 122, but it also prevents bodily slipping of the severing device 100 along the shaft arm 95 during its combined vertical rocking and horizontal oscillatory movements above described.

At its inner part the lever 60 fixedly carries a housing 132 in which is placed a sliding stop pin 133 which is pressed forward by a spring 134, so as to normally project from the housing in front of a stop pin 135 fixed in the casing cover lug 62, as shown in Fig. 1, to limit the upward return strokes of the lever while it actuates the pawl 52, rod 44, and plunger 14 for expelling butter from the container 9. A finger pin 136 fixed in the lever pin 133 and projecting through a slot 137 in the housing 132, provides for temporarily holding back the pin 133, from in front of the pin 135, to allow further and extreme upward movement of the lever 60, as shown in Fig. 18, which causes the cam 64 on the lever shaft 61 to disengage both the pawl 52 and the detent 55 from the plunger rod teeth 45, as shown in Fig. 13 to allow the plunger to be quickly withdrawn from the container 9, when the casing cover 2 is to be opened for recharging the container or for cleaning or icing purposes.

When a plunger rod 44, pawl 52 and detent 55, last used are to be substituted by another rod, pawl and detent having longer or shorter teeth for varying the size of the severed butter patties, the cam shaft 61 also may need changing, and after the substituted parts are assembled there may arise a necessity for nicely adjusting the lever 60 and the segment gear 92 upon the cam shaft 61, to assure proper relative timing of the effective butter expelling strokes of the plunger 14, and of the butter patty severing device 100. As the means employed for effecting these lever and gear adjustments are substantially similar it is deemed sufficient to fully illustrate only the lever adjusting means which is shown in Figs. 1, 5 and 18, and comprises two screws 138, 139, threaded into the hub of the lever and acting upon opposite sides of a tongue 140 formed on the cam shaft 61. These screws have locks 141 securing them after the lever is accurately adjusted upon the shaft. A third set screw 142 may be used to bind upon the uncut portion of the shaft, as shown in Fig. 18, and omitted in Fig. 5, which shows one of two screws 138ª (similar to the screws 138—139) which lock the accurately adjusted gear 92, to the cam shaft 61. A wire stay 143, shown in Fig. 1, or any other suitable device, may be used to limit the backward opening movement of the casing cover 2, upon its hinges 3. An elastic buffer 144 on the lever 60 strikes the casing cover 2 at the limit of the down stroke of the lever. A bottom tap 145 provides for draining off excess of cooling fluid from the casing.

In view of the aforesaid general description of the machine, a comparatively brief summary of its complete operation will suffice. When the plunger 14 is withdrawn from the container 9, the cover 2 is opened and the container is charged with butter 15 to be formed into patties. After the cover 2 is closed the lever 60 is depressed from the position shown in Fig. 1 until its buffer 144 strikes the cover 2. As the lever pin 133 is now projected and strikes the stop 135 on the casing lug 62, at the next upward movement of the lever, the pawl 52 and the detent 55 will surely engage with the plunger rod rack 45, and the downstroke of the lever in direction of arrow c in Fig. 1, will turn the shaft 61 in direction of the arrow d, in Fig. 12 and cause the heel 65 of the cam 64 to press upon the anti-friction roller supported saddle 85, and thereby depress the pawl 52 and likewise depress the engaged rod 44 and the plunger 14 for a distance equaling the length of one rod tooth 45, to express sufficient butter from the mouth 12 of the container 9 to form a patty when severed from the butter mass. During this downstroke of the lever 60, the saddle 85, under pressure of the cam heel 65, rides upon the rollers 82 which travel up the inclined pawl track 81, whereby the spring supported pawl 52 is held or forced backward to positively maintain engagement of its teeth 53 with the plunger rod teeth 45. As the plunger 14 descends, its rod teeth 45 slip over the detent teeth 70 and force the detent 55 outward and about at completion of the lever downstroke the detent 55 under influence of the spring 74 engages other rack teeth 45 to hold the plunger while the lever 60 is retracted upward to the position shown in Fig. 1, when the cam 64 and the roller supported saddle 85 have relative positions shown in Fig. 3. The pawl 52 having been raised by the spring 90, as permitted by the position of the cam 64, the pawl teeth 53 engage another series of the plunger rod teeth 45, in readiness for again depressing the plunger 14 by the next downstroke of the lever to express sufficient butter from the container 9 to form the next patty.

During the upstroke of the lever 60, the meshed teeth of the segment gears 92, 93, turn the two-part shaft 94, 96, and the shaft arm 95, thereby swinging the severing device 100 from the full line position in Fig. 2, to the dotted position, thus causing its cutter 116 to sever the butter mass protruding from the container mouth 12, to form a patty which drops from the cutter. After completion of the patty severing operation the part 131 of the severing device 100 rides under and past the end 128 of the yielding switch 122, as Fig. 10 indicates, and about as the severing device begins its retractive movement from the dotted position to the full line position, its part 131 rides over the inclined back of the now closed switch 122, as shown in Fig. 11, thereby rocking the severing device on the shaft arm 95, to carry its cutter 116 downward below the level of the container mouth 12 sufficiently far to entirely clear the butter now being expressed therefrom by the concurrent down stroke of the lever and plunger. As the severing device nearly reaches it retracted full line position of Fig. 2, its cross bar 112 strikes the fixed guide stop 120, which reversely rocks the severing device on the shaft arm 95 to again raise its cutter 116 about level with the container mouth 12, in readiness for severing the next butter patty in manner above described.

When the plunger 14 has advanced to the butter container guard flange 13, the container 9 must be recharged with butter. To do this it is necessary to first withdraw the plunger 14 from the container to allow the hinged casing cover 2 to be opened. To assure the quick and easy manual withdrawal of the plunger from the container while the casing cover is closed, it is only necessary to press back the lever pin 133, by its finger stud 136, so that said pin 133 no longer stands in front of the stop 135 on the casing lug 62, thus allowing the lever 60 to be swung to the full limit of its upward stroke, as shown in Fig. 18, thereby first causing the cam face 67 to move the anti-friction roller saddle 85 outward upon the pawl track 81, and against the pawl shoulder 88, and then to swing the teeth 53 of the spring suspended pawl 52 clear of the plunger rod teeth 45, and simultaneously the pawl pin 68, presses the detent 55 in similar direction to disengage it from the plunger rod, thus leaving the rod 44 free to be manually pulled upward to quickly withdraw the plunger 14 from the container 9. The casing cover 2 may now be unlatched and opened by operating the handle lever 32, to allow the recharging of the container 9, or the replenishing of the ice or of the reserve butter supply in the casing body 1, or to permit cleansing of all interior parts of the machine.

Figs. 3 and 5 show that the extremity of the container neck 11, around its mouth or discharge opening 12, is rounded over at 9ᵇ, thereby preventing sticking of the severed butter patties to the container neck. This result may follow the rounding over of only the inner corner of the container mouth, but it is preferred to round over both its inner and outer corners, or to give the extremity of the container neck the half-round form shown at 9ᵇ in the drawings.

It is not essential that all the illustrated parts be used in carrying out this invention, as for instance, the anti-friction rollers 82 may be omitted and the saddle or block 85 would then slide directly on the track 81 of the pawl 52, or both rollers and saddle may be omitted and a cam would then act directly on the pawl 52, which is yieldingly sustained independently of the oscillatory prime moving lever or part 60. Extensive practical experience has demonstrated the superior results attending the use of these parts 82, 85, with the pawl and the cam shaft, and they are therefore employed in what is now believed to be a practical embodiment of the invention, the details of construction of which may be otherwise varied within the scope of the appended claims.

This improved machine is hereinabove described with more special reference to its use for forming butter patties, but it may be used with similar advantages in forming patties from any butter substitute, or from cheese, and it may also be used for forming prints or shapes from any other plastic material which may be worked in a machine of this general character.

The machine herein shown and described advantageously incorporates certain desirable novel features not hereinafter specifically claimed, but to which it is desirable to briefly refer, as follows: The first incorporated feature includes forming or providing the machine casing in which is placed the butter container, with chamber space outside of the container adapted for storing given reserve quantities of butter, or butter cylinders 9ᵃ, to be used as charges for the container in which there is a movable plunger expelling butter from the container outlet across which acts the cutter of a severing device which divides the intermittently expelled butter mass to form successive butter patties. Another incorporated feature includes a construction of the casing with a bottom recess, such as that shown at 8, in which a butter container is placed and which maintains around the lower discharge portion of the container a comparatively small quantity or volume of the ice or other cooling medium placed within the casing, to keep said lower discharge end of the container at the same or a slightly warmer temperature than its main body portion to assure intermittent discharge of butter from the container at a consistency causing the patties cut therefrom to be not too soft or too hard for immediate satisfying use. Another incorporated feature comprises such relative arrangement of the plunger rod, the pawl advancing it step-by-step, and the detent holding the advanced plunger, as assures a slight retrograde movement of the plunger after each advance of it by the pawl and prior to the locking of the plunger by the detent in its advanced position, to relieve the pressure of the plunger on the expansible mass of butter in the container, thereby arresting the tendency of the butter to exude from the container outlet except as it may be forcibly expelled therefrom by the next advance step of the plunger.

I claim as my invention:

1. In a machine for forming butter patties, the combination with a butter container, a plunger therein having an operating rod, a shaft, an oscillatory lever for rocking it, and a pawl independent of the lever and engaging the plunger rod, of a cam on the shaft actuating the pawl as the lever is oscillated, a yielding detent for locking the rod, means yieldingly supporting the pawl and moving it toward the cam, a relatively fixed stop adjacent the lever, and an adjustable part on the lever normally positioned to engage said stop to limit the movement of the pawl with the rod, said lever part when withdrawn permitting a further movement of the lever for disengaging the pawl from the plunger rod.

2. In a machine for forming butter patties, the combination with a butter container, a plunger therein having an operating rod, a shaft, and an oscillatory part for rocking said shaft, of a pawl yieldingly sustained independently of the lever and adapted to engage the plunger rod, a cam on the lever shaft having a portion actuating the pawl to move the plunger rod as the lever is moved in one direction, and a yielding detent for locking the rod, said cam also having a trip portion which disengages the pawl from the plunger rod as the lever approaches the limit of its movement in the other direction, and said pawl having a portion which disengages the detent from the plunger rod simultaneously with the disengagement therefrom of the pawl.

3. In a machine for forming butter patties, the combination with a butter container and a plunger therein having an operating rod, of a shaft, an oscillatory lever for rocking said shaft, and a pawl yieldingly sustained independently of the lever and adapted to engage the plunger rod, a portion of the lever shaft being cut away to form a cam with a heel portion for advancing the pawl as the lever is moved in one direction and a shoulder which disengages the pawl from the plunger rod as the lever is moved toward the limit of its travel in the other direction.

4. In a machine for forming butter patties, the combination with a butter container and a plunger therein having an operating rod, of a shaft, an oscillatory lever for rocking said shaft, a pawl adapted to engage the plunger rod and having a track, means for retracting the pawl, a pressure block movable on the pawl track, and a cam on the shaft having a portion acting on the block to depress the pawl against the plunger rod for intermittently advancing the plunger.

5. In a machine for forming butter patties, the combination with a butter container and a plunger therein having an operating rod, of a shaft, an oscillatory part for rocking said shaft, a yieldingly supported pawl adapted to engage the plunger rod and having a track inclined upwardly toward the rod, means for retracting the pawl, a saddle block movable along the inclined pawl track, and a cam on the shaft having a portion acting on the saddle to positively engage the pawl with the plunger rod and advance the plunger.

6. In a machine for forming butter patties, the combination with a butter container and a plunger therein having an operating rod, of a shaft, an oscillatory part for rocking said shaft, a pawl adapted to engage the plunger rod and having a track and an adjacent outer shoulder, means retracting the pawl, a saddle block adapted to move along the pawl track and to engage said shoulder, a cam on the shaft having a heel portion acting on the saddle to depress the pawl when engaged with the plunger rod when the cam is moved in one direction, said cam also having a toe portion for forcing the saddle backwardly into contact with the pawl shoulder and to disengage the pawl from the plunger rod when the cam approaches the limit of its movement in the other direction, a yielding detent for locking the plunger rod when the pawl is retracted, and coacting parts on the pawl and the detent for disengaging the detent from said rod simultaneously with disengagement of the pawl therefrom.

7. In a machine for forming butter patties, the combination with a butter container and a plunger therein having an operating rod, a pawl adapted to engage the rod and having a guiding yoke loosely inclosing it, means yieldingly sustaining the pawl, and means operating on the pawl for depressing the plunger rod.

8. In a machine for forming butter patties, the combination with a container, a piston therein, and a piston rod, of an oscillatory cam located at one side of the rod having an operating portion rotatable in a direction downwardly and laterally toward the rod, and a pawl member suspended against the side of the rod and having an inclined surface coöperating with the cam to move the pawl first laterally and then downwardly.

9. In a machine for forming butter patties, the combination with a container, a piston therein, and a piston rod, of an oscillatory cam at one side of the rod having a heel portion movable downwardly and toward the rod when the cam is rotated in one direction and a toe portion movable downwardly and away from the rod when the cam is rotated in the other direction, a pawl engaging the side of the rod and projecting beneath the cam and coöperating with the heel portion thereof to move the pawl into engagement with the rod and downwardly therewith and also coöperating with the toe portion of the cam to move said pawl out of engagement with the rod.

10. In a machine for forming butter patties, the combination with a container, a piston therein, and a piston rod, of an oscillatory cam at one side of the rod and spaced therefrom having a heel portion movable downwardly and toward the rod when the cam is rotated in one direction and a toe portion movable downwardly and away from the rod when the cam is rotated in the other direction, a pawl engaging the side of the rod and interposed between it and the cam and having an offset lower end projecting beneath the cam and coöperating with the heel portion thereof to move it into engagement with the rod and downwardly therewith and also coöperating with the toe portion of the cam to move said pawl out of engagement with the rod.

11. In a machine for forming butter patties, the combination with a casing including body and cover portions, a butter container in the casing body having a discharge opening and a plunger for expelling the butter from the container, of a patty severing device embodying a cutter movable across the discharge opening, a shaft comprising two members, one of which is sustained by the casing body and carries said severing device, the other being sustained by the cover, a coupling for the two shaft members comprising complementary interlocking parts which operate when the casing cover is closed to automatically move the severing device to its normal position, and mechanism for actuating said patty severing device.

12. In a machine for forming butter patties, the combination with a casing including body and cover portions, a butter container in the casing body having a discharge opening, and a plunger for expelling the butter from the container, of a patty severing device embodying a cutter movable across said discharge opening, a shaft having two members, one of which is sustained by the casing body and carries said severing device and the other of which is sustained by the casing cover, a coupling for the two shaft members having interlocking parts comprising meeting shoulders which when the casing cover is closed coact to restore the cutter to its normal position, means for yieldingly supporting one of the shaft parts to ease the shock attending engagement of their coupling parts, and mechanism actuating the coupled shaft members.

13. In a machine for forming butter patties, the combination with a casing comprising a body and a closure therefor, a container in the body portion having a discharge nozzle opening below the bottom of the body, a plunger for expressing butter from the container and a lever on the cover for intermittently operating the plunger, of a two part shaft extending through the body and closure, automatic coöperating coupling members for the shaft parts within the body, connections between the lever and the shaft for oscillating it, and a cutter carried on the lower end of the shaft and coöperating with the discharge nozzle.

14. In a machine for forming butter patties, the combination with a casing including body and cover portions, a butter container in the casing body having a discharge opening, a plunger in the container, and mechanism on the cover for operating the plunger, of a butter patty severing device comprising a cutter movable across the discharge opening, a shaft composed of two detachably interlocking members, one sustained by the casing body and carrying said severing device and the other being sustained by the casing cover, and means on the casing cover actuated by the plunger operating mechanism for operating the coupled shaft members.

15. In a machine for forming butter patties, the combination with a casing including body and cover portions, a container in the casing body having a discharge opening, means for expelling the contents of the container, and mechanism on the cover for operating said means, of a butter patty severing device comprising a cutter movable across the discharge opening, a shaft having two members, 94, 96, the latter having an arm 95 sustaining the severing device, a coupling for the shaft members comprising two blocks, 101, 104, respectively having meeting faces and shoulders 109, 110, 111, one of said blocks having an outer guard 102 receiving and guiding the meeting parts of the other block, and mechanism actuating the coupled shaft members and the patty severing device.

16. In a machine for forming butter patties, the combination with a casing including body and cover portions, a container in the casing body having a discharge opening, means for expelling the contents of the container, and mechanism on the cover operating said means, of a patty severing device including a cutter movable across the discharge opening, a shaft having two members 94, 96, the latter having an arm 95 sustaining the severing device, a coupling for the shaft members comprising two blocks 101, 104, respectively having meeting faces and shoulders 109, 110, 111, a spring buffer 107 on the shaft member 96, and mechanism actuating the coupled shaft members and the patty severing device.

17. In a machine for forming butter patties, the combination with a casing including body and cover portions, a butter container fixed in the casing body having a discharge opening, a plunger in the container, and mechanism on the cover for operating the plunger, of a butter patty severing device including a cutter movable across the container opening, a shaft having two detachably interlocked parts, sleeves fixed to the casing body and cover inclosing the shaft parts, and mechanism actuating the coupled shaft members.

18. In a machine for forming butter patties, the combination with a butter container having a discharge nozzle and means for expelling butter therefrom, of an oscillatory and rocking patty severing device having a forward oscillatory stroke severing the expelled butter mass at the container nozzle, and means for subsequently rocking the cutter to throw it away from the plane of the nozzle before the severing device passes the nozzle on its backward oscillatory stroke.

19. In a machine for forming butter patties, the combination with a butter container having a discharge opening, and means for expelling butter therefrom, of an oscillatory and rocking patty severing device having a forward oscillatory stroke for severing the expelled butter mass at the discharge opening, a following rocking movement which throws the cutter out of the plane of the discharge opening where it remains as the severing device makes its backward oscillatory stroke, and two stops respectively arranged at opposite sides of the center of oscillatory movement of the severing device for automatically rocking it into and out of the plane of the butter container opening.

20. In a machine for forming butter patties, the combination with a butter container having a discharge opening, and means for expelling butter therefrom, of an oscillatory and rocking patty severing device having a forward oscillatory stroke for severing the expelled butter mass at the discharge opening, a following rocking movement which throws the cutter out of the plane of the discharge opening where it remains as the severing device makes its backward oscillatory stroke, and two stops respectively arranged at opposite sides of the center of oscillatory movement of the severing device for automatically rocking it into and out of the plane of the butter container opening, one of said stops comprising a fixed arm struck by the severing device to adjust its cutter into the plane of the discharge opening prior to its forward cutting stroke, and the other stop comprising a normally closed yielding inclined switch arm.

21. In a machine for forming butter patties, the combination with a butter container having a discharge opening, and means for expelling butter therefrom, of a shaft having an arm adapted to oscillate transversely of the container mouth, a patty severing device adapted to rock on said arm to throw the patty cutter into and out of the plane of the container mouth, and means frictionally holding the severing device at either extreme of its rocking movement on the shaft arm.

22. In a machine for forming butter patties, the combination with a butter container having a discharge opening, and a plunger in the container having an operating rod, of a shaft, an oscillatory lever for rocking said shaft, a pawl adapted to engage the plunger rod, means on the lever shaft advancing the pawl and the plunger as the lever is moved downwardly, a butter patty severing device including a cutter movable across the container opening, an oscillatory shaft supporting the severing device, and intermeshing gears on the lever shaft and the severing device shaft actuating said device to sever a patty as the lever is moved upwardly.

23. In a machine for forming butter patties, the combination with a butter container having a discharge opening, and a plunger in the container having an operating rod, of a shaft, an oscillatory lever for rocking said shaft, a pawl adapted to engage the plunger rod, means on the lever shaft advancing the pawl and the plunger as the lever is moved downwardly, a detent holding the plunger when the lever and pawl are retracted, a butter patty severing device including a cutter movable across the container opening, an oscillatory shaft supporting the severing device, and intermeshing gears on the lever shaft and the severing device shaft actuating said device to sever a patty as the lever is moved upwardly, the plunger rod, the pawl and the detent being removable for substitution of a rod, and a pawl having teeth of different pitch to provide for varying the size of the severed butter patties.

24. In a machine for forming butter patties, the combination with a butter container having a discharge opening, and a plunger in the container having an operating rod, of a shaft, an oscillatory lever for rocking said shaft, a pawl adapted to engage the plunger rod, means on the lever shaft advancing the pawl and the plunger as the lever is moved downwardly, a butter patty severing device including a cutter movable across the container opening, an oscillatory shaft supporting the severing device, intermeshing gears on the lever shaft and the severing device shaft actuating said device to sever a patty as the lever is moved upwardly, the operating lever and the gear being adjustable on the lever shaft to properly time the relative movements of the butter expelling plunger and the butter patty severing device as the lever is operated.

25. In a machine for forming butter patties, the combination with a butter container having a discharge opening, and a plunger in the container having an operating rod, of a shaft, an oscillatory lever on said shaft, a pawl adapted to engage the plunger rod, means on the lever shaft for advancing the pawl and the plunger as the lever is moved in one direction, a detent holding the plunger when the lever and pawl are retracted, a laterally oscillating and vertically rocking butter patty severing device including a cutter movable across the container opening, an oscillatory shaft supporting the severing device, intermeshing gears on the lever shaft and the severing device shaft actuating said severing device as the lever is moved in the other direction and during retraction of the plunger actuating pawl, said severing device being retracted by the next downward movement of the plunger, and two stops respectively arranged at opposite sides of the center of oscillatory movement of the severing device and automatically rocking it to adjust its cutter into the plane of the butter container opening prior to its forward severing stroke, and to throw the cutter out of the plane of said opening after the patty is severed.

26. In a machine for forming butter patties, the combination with a butter container having a discharge opening, a plunger in the container, an oscillatory lever which on its downward stroke advances the plunger to expel butter from the container, a severing device operating across the container opening to sever the expelled butter, and mechanism operated by the upward stroke of the lever actuating the severing device in timed relation to operation of the plunger to cause severing of the expelled butter to form a patty.

27. In a machine for forming butter patties, the combination with a butter container having a discharge opening, a plunger therein for expelling the butter, an oscillatory and rocking severing device, mechanism advancing the plunger and oscillating the severing device in timed relation to cause severing of the expelled butter to form a patty, and two stops respectively arranged at opposite extremes of oscillation of the severing device, one stop rocking said device to aline its cutter with the container opening prior to the patty severing operation, and the other stop rocking the cutter downwardly upon oscillative retraction of the severing device to have its cutter pass clear of the butter then being expelled from the container by the plunger.

28. In a machine for forming butter patties, the combination with a butter container having a discharge opening, a plunger in the container, an oscillatory severing device having a cutter operating across the container opening to sever the expelled butter, a shaft, an oscillatory lever for rocking said shaft, cam mechanism interposed between the lever shaft and the plunger to advance the latter in the container for expelling butter therefrom as the lever is moved downwardly, and means interposed between the lever and the severing device imparting to said device its effective patty severing movement during the upward stroke of the lever.

29. In a machine for forming butter patties, the combination with a butter container having a discharge opening, a plunger in the container, an oscillatory and rocking severing device having a cutter operating across the container opening to sever the expelled butter, a shaft, an oscillatory lever for rocking said shaft, cam mechanism interposed between the lever shaft and the plunger to advance the latter in the container as the lever makes its downward stroke, and means interposed between the lever and the severing device giving said device its effective patty severing movement during the upward stroke of the lever and oscillatively retracting the severing device during the downward stroke of the lever, and two stops respectively arranged at opposite extremes of oscillation of the severing device, one stop rocking said device to aline its cutter with the container opening prior to the patty severing operation, and the other stop carrying the cutter downwardly upon oscillative retraction of the severing device to have its cutter pass clear of the butter then being expelled from the container by the plunger.

ALVIN F. NYE.